G. W. TAYLOR.
WHEEL SCRAPER.
APPLICATION FILED JUNE 5, 1913.
1,139,599.   Patented May 18, 1915.
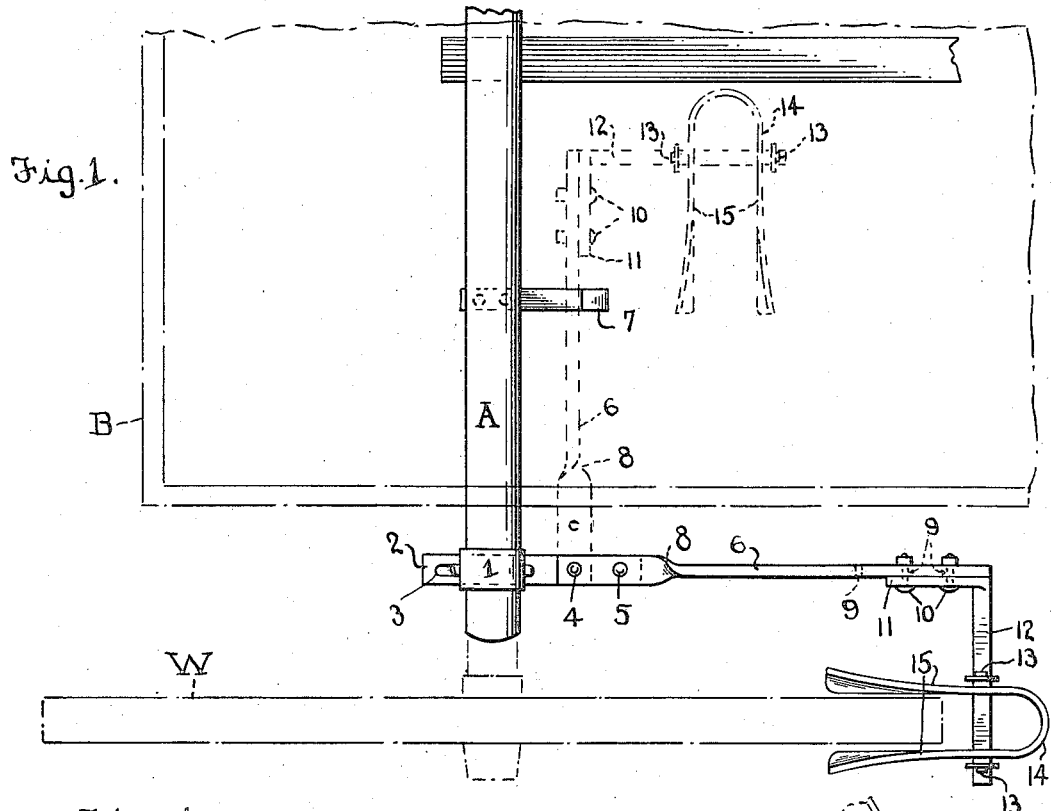
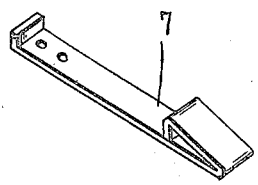
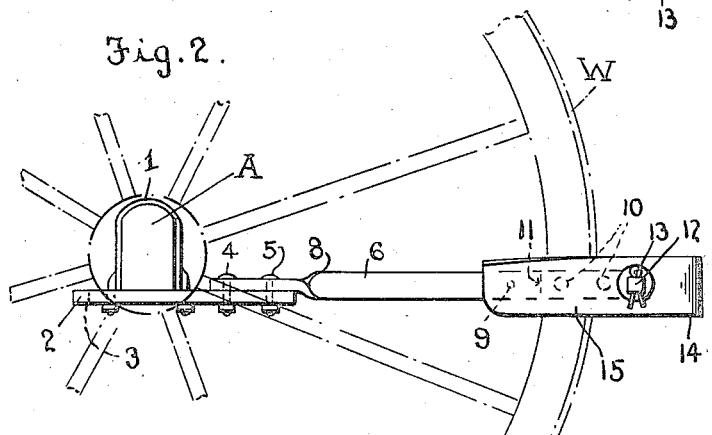
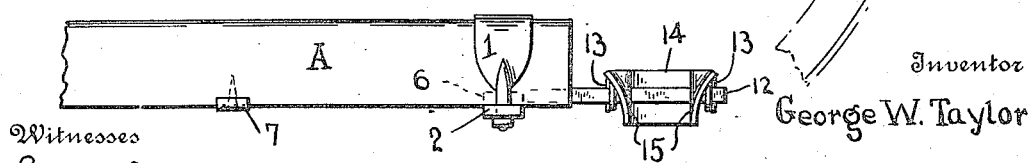
Inventor
George W. Taylor
Witnesses
L. B. James
J. Ralph Hogl
By H. B. Willson & Co
Attorneys

UNITED STATES PATENT OFFICE.

GEORGE W. TAYLOR, OF FAYETTE, MISSOURI.

WHEEL-SCRAPER.

1,139,599.   Specification of Letters Patent.   Patented May 18, 1915.

Application filed June 5, 1913. Serial No. 771,965.

*To all whom it may concern:*

Be it known that I, GEORGE W. TAYLOR, a citizen of the United States, residing at Fayette, in the county of Howard and State of Missouri, have invented certain new and useful Improvements in Wheel-Scrapers; and I do declare the following to be a full, clear, and exact description of the invention, such as will enable others skilled in the art to which it appertains to make and use the same.

This invention relates to carriages and wagons, and more particularly it is a scraper to clean the mud from the wheels.

The object of the invention is to provide an improved, adjustable, and movable scraper capable of being attached to the wagon body or axle in such position that it may be thrown out into coactive relation with the rear side of the wheel, so that the mud will be scraped off the latter and will not be carried over and dropped onto the step. This object is accomplished by constructing the scraper in the manner set forth below and shown in the drawings wherein—

Figure 1 is a plan view of this device in action, the wheel and the wagon body being shown in dotted lines. Fig. 2 is a side elevation of the same. Fig. 3 is a front elevation. Fig. 4 is a perspective detail of the hook.

In the drawings the letter A designates an axle, B is the body of the vehicle, and W is the front end of one of the front wheels. It is to be understood that there are four of these devices, one on each wheel, but we need describe and show but one. A clip 1 passes over the axle and connects with an inner member 2 which is slotted as at 3 so that the clip may be sprung outward or inward to engage an axle of greater or lesser size. This member is pierced with two holes through which pass bolts 4 and 5 which take also through the inner end of an outer member 6. The innermost bolt 4 acts as a pivot between the members, and the outermost bolt 5 may be removed, and when removed the outer member and the parts carried thereby may be swung around parallel with the axle and engaged with a spring hook 7 also carried by the axle as shown in Fig. 1, the arm 12 to be described having first been swung up or down as will be hereinafter described. Thus the device may be thrown out of action when it is not desired to use it. The outer member 6 is by preference given a twist 8 within its body so that its rear end stands on edge as shown, and this end is pierced with a series of holes 9 which are useful for receiving two bolts 10 that pass through the foot 11 of an L-shaped bracket which is thus adjustably secured to the outer member. The outstanding square arm 12 of this bracket is pierced with upright holes for cotter pins 13 or the like, and between said cotter pins stands a U-shaped scraper 14 whose bend is disposed in rear of the arm 12 and whose arms 15 have square holes fitting said arm 12. Said arms 15 project toward the front and are slightly twisted so that they diverge upward from their lower to their upper edges as seen in Fig. 3.

With this construction of parts, when the device is not in use one of the bolts 10 is removed and the arm 12 swung to disengage the scraping element from the wheel. Then the bolt or pin 5 is removed and the outer member 6 and the bracket swung back until the member stands parallel with the axle and is engaged by the hook 7. The bolt 10 is then again inserted to hold the scraper and its arm in substantially the same horizontal plane as arm 6. When the device is to be used it is disengaged from said hook and swung forward and the bolt 5 restored to position after one of the bolts 10 has been removed. The scraper 14 may then be swung against the rear side of the wheel and the bolt 10 restored. The arms 15 will then scrape at their lower edges against the sides of the felly while their diverging upper edges cause the mud to fall away from the wheel. What the latter picks up on the roadway is obviously carried up the rear side thereof and is generally carried over the top and dropped onto the thills or step, but this disposition of my scraper at the point shown prevents this and hence leaves the parts clear. I would make the parts entirely of metal, preferably japanned, galvanized or otherwise treated to prevent rust; and the precise details and proportions are obviously not important to the success of this invention.

What is claimed as new is:

A wheel scraper comprising an attaching bar having a laterally extending arm angular in cross section, a U-shaped scraping element having registering apertures in the legs thereof intermediate of their ends conforming in shape to the cross sectional shape of said arm and in which said arm is mounted, whereby the scraping element is held against turning, said legs diverging from a point midway their length toward their free ends and each free end being curved transversely from its lower toward its upper edge providing transversely convexed inner faces forming a flared curved mouth.

In testimony whereof I have hereunto set my hand in presence of two subscribing witnesses.

GEORGE W. TAYLOR.

Witnesses:
J. W. ARMSTRONG,
W. R. PIERCE.